US012807427B2

(12) United States Patent
Clare

(10) Patent No.: US 12,807,427 B2
(45) Date of Patent: Nov. 24, 2026

(54) SPRING TRANSFER APPARATUS AND METHOD

(71) Applicant: HS PRODUCTS LTD, Leeds (GB)

(72) Inventor: David Clare, Leeds (GB)

(73) Assignee: HS PRODUCTS LTD, Leeds (GB)

( * ) Notice: Subject to any disclaimer, the term of this patent is extended or adjusted under 35 U.S.C. 154(b) by 0 days.

(21) Appl. No.: 18/841,200

(22) PCT Filed: Feb. 23, 2023

(86) PCT No.: PCT/GB2023/050418
§ 371 (c)(1),
(2) Date: Aug. 23, 2024

(87) PCT Pub. No.: WO2023/161643
PCT Pub. Date: Aug. 31, 2023

(65) Prior Publication Data

US 2025/0171247 A1 May 29, 2025

(30) Foreign Application Priority Data

Feb. 23, 2022 (GB) ..................................... 2202486

(51) Int. Cl.
*B65G 47/84* (2006.01)
*B21F 27/16* (2006.01)
(Continued)

(52) U.S. Cl.
CPC ............ *B65G 47/848* (2013.01); *B21F 27/16* (2013.01); *B65G 15/14* (2013.01); *B65G 29/00* (2013.01); *B65G 47/04* (2013.01); *B65G 15/20* (2013.01)

(58) Field of Classification Search
CPC ...... B65G 15/20; B65G 15/14; B65G 47/848; B65G 47/846; B21F 27/16
(Continued)

(56) References Cited

U.S. PATENT DOCUMENTS 3,426,884 A * 2/1969 Donner ................ B65G 47/848 198/408
3,754,635 A * 8/1973 Mojden .................. B65G 39/08 198/612
(Continued)

FOREIGN PATENT DOCUMENTS

CN 208249100 U 12/2018
CN 110040289 A 7/2019
(Continued)

OTHER PUBLICATIONS

CN 110040289 Chinese patent. (Year: 2021).*
(Continued)

*Primary Examiner* — Mark A Deuble
(74) *Attorney, Agent, or Firm* — Thomas Horstemeyer, LLP

(57) ABSTRACT

A spring transfer apparatus is shown generally at 1000. The apparatus comprises a wheel-like placement member 1100 which, in use, is driven to rotate in the direction of Arrow A1 about a central hub 1110 by a motor (not shown). The placement wheel 1100 has a plurality of circumferentially spaced spoke portions 1120 defining therebetween a series of spring chambers 1130. A magnetic base plate 1200 is arranged beneath the wheel 1100 and is arranged to receive a coil spring S which is deposited by a spring forming apparatus (not shown) of a known type, located above the plate 1200. As the wheel rotates, the spring is urged by the spokes 1120 along the magnetic base plate 1200 towards an arcuate compression stage 1300, comprising a pair of plates 1310 and 1320 that are axially spaced above and below the spring. The plates initially converge in a chamfer in the direction of rotation of the wheel 1100 causing the springs to become partly axially compressed as they transit between the plates. As the springs exit the plates, they are urged by the spokes into positions between a pair of superposed
(Continued)

Figure 1:
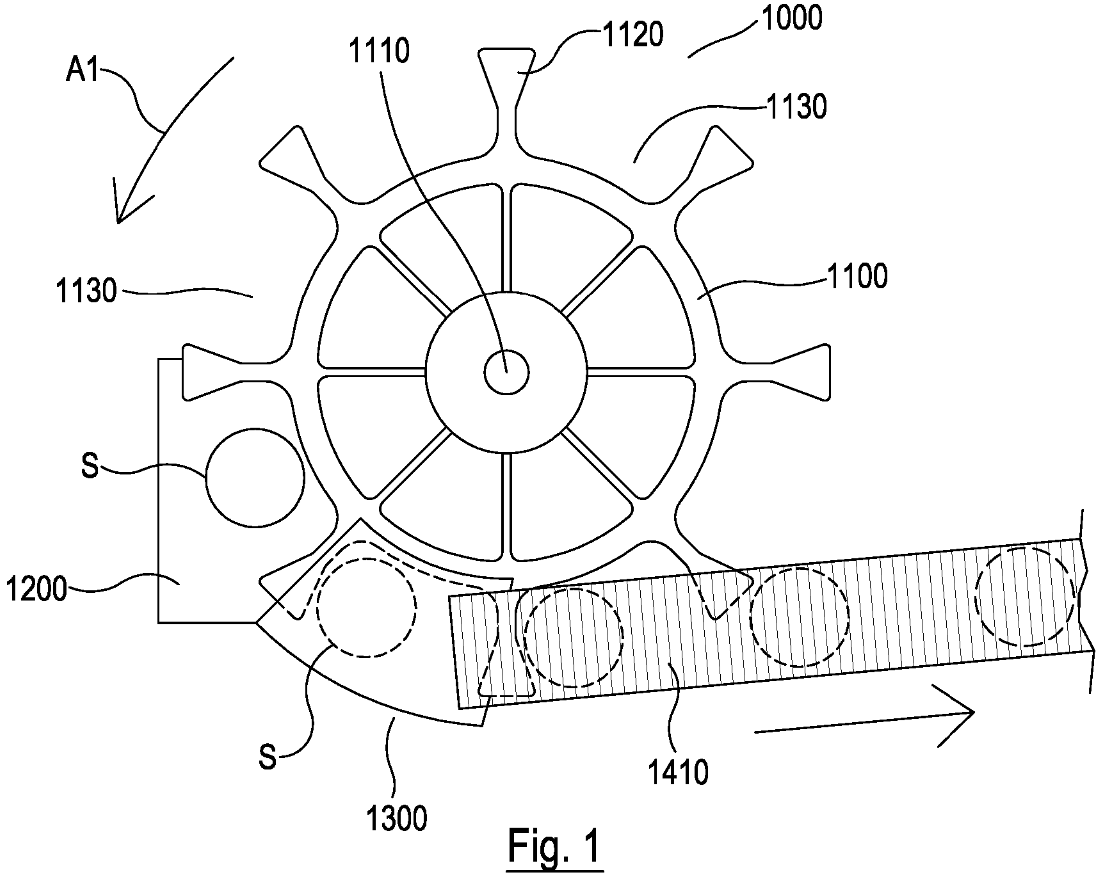

driven endless belts 1410 and 1420 between which the springs are further compressed and then conveyed to a pocketing station (not shown) where they are inserted into pockets for incorporation into a resilient spring unit, such as for use in a mattress core. The belts are optionally castellated to maintain a good grip of the springs.

10 Claims, 1 Drawing Sheet

(51) Int. Cl.

| | |
|---|---|
| ***B65G 15/14*** | (2006.01) |
| ***B65G 29/00*** | (2006.01) |
| ***B65G 47/04*** | (2006.01) |
| *B65G 15/20* | (2006.01) |

(58) Field of Classification Search
USPC .......................................................... 198/459.2
See application file for complete search history.

(56) References Cited

U.S. PATENT DOCUMENTS

| | | | | |
|---|---|---|---|---|
| 7,877,964 | B2 * | 2/2011 | Spinks | B68G 9/00 53/529 |
| 8,393,131 | B2 * | 3/2013 | Blunschi | B68G 9/00 156/558 |
| 8,739,962 | B2 * | 6/2014 | Bielenberg | B30B 5/06 198/604 |
| 9,713,836 | B2 * | 7/2017 | Liechti | B21F 27/16 |
| 9,944,465 | B2 * | 4/2018 | Saunders | B65G 15/14 |
| 10,633,245 | B2 * | 4/2020 | Clare | B68G 15/00 |
| 12,145,837 | B2 * | 11/2024 | Spinks | B65B 9/04 |
| 2021/0309507 | A1 * | 10/2021 | Spinks | B68G 9/00 |

FOREIGN PATENT DOCUMENTS

| | | | | | |
|---|---|---|---|---|---|
| CN | 213595236 | U | | 7/2021 | |
| GB | 2586159 | A | * | 2/2021 | B65B 63/026 |
| WO | WO-0238304 | A1 | * | 5/2002 | B21F 33/04 |

OTHER PUBLICATIONS

CN 116699164 Chinese patent. (Year: 2023).*
DE 10 2014 005 942 German patent. (Year: 2006).*
UK Search Report for Application No. GB2202486.3.

* cited by examiner

SPRING TRANSFER APPARATUS AND METHOD

CROSS-REFERENCE TO RELATED APPLICATION

This application is the 35 U.S.C. § 371 national stage application of PCT Application No. PCT/GB2023/050418, filed Feb. 23, 2023, where the PCT claims priority to and the benefit of, GB Patent Application No. 2202486.3, filed Feb. 23, 2022, both of which are herein incorporated by reference in their entireties.

The present invention relates to an apparatus and method for transferring springs in the manufacture of pocketed spring units.

The present invention is defined in the attached independent claims, to which reference should now be made. Further, preferred features may be found in the sub-claims appended thereto.

According to one aspect of the present invention, there is provided transfer apparatus for transferring springs from a spring forming station, at which springs are formed from a length of wire, to a pocketing station, at which the springs are encased in pocketing material, in the manufacture of a pocketed spring unit, the transfer apparatus comprising a conveyor having spaced-apart belts configured to move together between the spring forming station and the pocketing station, and a placement member for introducing the springs onto the conveyor, wherein the placement member includes at least one spring chamber for temporarily retaining a spring, and is arranged to rotate about a rotation axis, and wherein the placement member is positioned with respect to the conveyor so that during rotation of the placement member the, or each, spring chamber passes at least partly between the moving belts and the spring is captured by the belts.

Preferably, the rotation axis is substantially parallel with an axis of the spring.

The apparatus may comprise a compression portion arranged to compress the spring axially prior to capture of the spring by the belts. In a preferred arrangement, the compression portion comprises a pair of spaced compression members between which the spring is arranged to pass as the placement member rotates. The compression members may be arranged to converge in the direction of movement of the spring and preferably comprise a pair of plates.

The transfer apparatus may comprise a magnetic base adjacent, and more preferably beneath, the placement member. The magnetic base may be arranged in use to retain the spring such that the spring axis is substantially parallel with the rotation axis of the placement member.

The magnetic base may be placed proximate to the spring forming station in use, optionally so that the spring comes under the magnetic influence of the base prior to being cut from the length of wire.

The placement member may comprise a plurality of spring chambers which are preferably spaced around a substantially circular path traced by the chambers during rotation of the placement member. The, or each, chamber preferably comprises a channel extending substantially parallel with the rotation axis and is preferably substantially open at each end. The channel may be defined by channel edge/spoke portions of the placement member.

In a particularly preferred arrangement, the placement member is substantially circular in plan and preferably substantially cylindrical in shape, with the or each spring chamber located around a circumferential outer edge of the placement member.

According to another aspect of the present invention, there is provided a method of conveying springs from a spring forming station, at which springs are formed from a length of wire, to a pocketing station, at which the springs are encased in pocketing material, in the manufacture of a pocketed spring unit, the method comprising temporarily retaining the springs in spring chambers on a placement member and causing the placement member to rotate so that the spring chambers each pass at least partly between moving conveyor belts causing the springs to be captured by the belts.

In a further aspect, the invention provides a computer programme product on a computer readable medium, comprising instructions that, when executed by a computer, cause the computer to perform a method of conveying springs from a spring forming station, at which springs are formed from a length of wire, to a pocketing station, at which the springs are encased in pocketing material, in the manufacture of a pocketed spring unit, the method comprising temporarily retaining the springs in spring chambers on a placement member and causing the placement member to rotate so that the spring chambers each pass at least partly between moving conveyor belts causing the springs to be captured by the belts.

The invention also comprises a program for causing a device to perform a method of conveying springs from a spring forming station, at which springs are formed from a length of wire, to a pocketing station, at which the springs are encased in pocketing material, in the manufacture of a pocketed spring unit, the method comprising temporarily retaining the springs in spring chambers on a placement member and causing the placement member to rotate so that the spring chambers each pass at least partly between moving conveyor belts causing the springs to be captured by the belts.

The invention may include any combination of the features or limitations referred to herein, except such a combination of features as are mutually exclusive, or mutually inconsistent.

Figure 2:
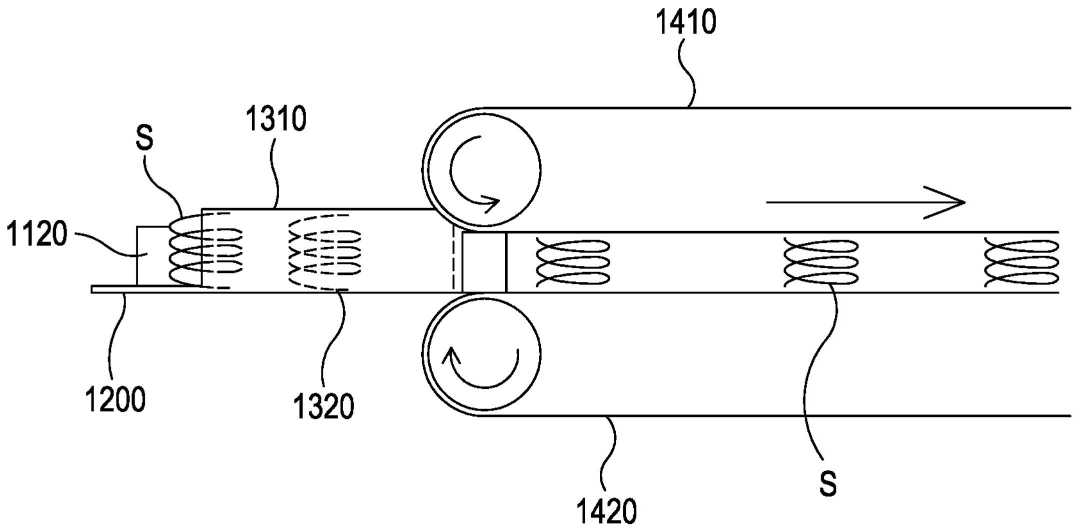

A preferred embodiment of the present invention will now be described, by way of example only, with reference to the accompanying diagrammatic drawings, in which:

FIG. 1 shows, in plan schematic view, a spring transfer apparatus according to an embodiment of the present invention; and FIG. 2 shows the apparatus of FIG. 1 in schematic side view.

Turning to the drawings, these show a spring transfer apparatus, generally at 1000. The apparatus comprises a wheel-like placement member 1100 which, in use, is driven to rotate in the direction of Arrow A1 about a central hub 1110 by a motor (not shown). The placement wheel 1100 has a plurality of circumferentially spaced spoke portions 1120 defining therebetween a series of spring chambers 1130.

A magnetic base plate 1200 is arranged beneath the wheel 1100 and is arranged to receive a coil spring S which is deposited by a spring forming apparatus (not shown) of a known type, located above the plate 1200.

As the wheel rotates, the spring is urged by the spokes 1120 along the magnetic base plate 1200 towards an arcuate compression stage 1300, comprising a pair of plates 1310 and 1320 that are axially spaced above and below the spring. The plates initially converge in a chamfer in the direction of rotation of the wheel 1100 causing the springs to become partly axially compressed as they transit between the plates.

As the springs exit the plates, they are urged by the spokes into positions between a pair of superposed driven endless belts 1410 and 1420 between which the springs are further compressed and then conveyed to a pocketing station (not shown) where they are inserted into pockets for incorporation into a resilient spring unit, such as for use in a mattress core. The belts are optionally castellated to maintain a good grip of the springs.

The rotating placement member need not stop and can instead operate continuously, inserting springs into position between the belts. The magnetic base plate helps to ensure that the springs remain firmly in the spring chambers between the spokes after they are delivered by the spring forming head. The invention allows for a much greater rate of transfer of springs from the spring forming head to the pocketing station, in the production of pocketed spring units such as are used as core components for mattresses.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A transfer apparatus for transferring springs from a spring forming station, at which springs are formed from a length of wire, to a pocketing station, at which the springs are encased in pocketing material, in the manufacture of a pocketed spring unit, the transfer apparatus comprising a conveyor having spaced-apart belts configured to move together between the spring forming station and the pocketing station, and a placement member for introducing the springs onto the conveyor, wherein the placement member includes at least one spring chamber for temporarily retaining a spring, and is arranged to rotate about a rotation axis, and wherein the placement member is positioned with respect to the conveyor so that during rotation of the placement member the, or each, spring chamber passes at least partly between the moving belts and the spring is captured by the belts, wherein the transfer apparatus comprises a magnetic base beneath the placement member.

2. An apparatus according to claim 1, wherein the rotation axis is substantially parallel with an axis of the spring.

3. An apparatus according to claim 1 or 2, wherein the apparatus further comprises a compression portion arranged to compress the spring axially prior to capture of the spring by the belts.

4. An apparatus according to claim 3, wherein the compression portion comprises a pair of spaced compression members between which the spring is arranged to pass as the placement member rotates.

5. An apparatus according to claim 4, wherein the compression members comprise a pair of plates and are arranged to converge in the direction of movement of the spring.

6. Apparatus according to claim 1, wherein the magnetic base is arranged in use to retain the spring such that the spring axis is substantially parallel with the rotation axis of the placement member.

7. Apparatus according to claim 1, wherein the placement member comprises a plurality of spring chambers which are spaced around a substantially circular path traced by the chambers during rotation of the placement member.

8. Apparatus according to claim 7, wherein the, or each, chamber comprises a channel extending substantially parallel with the rotation axis, which channel is substantially open at each end.

9. Apparatus according to claim 8, wherein the channel is defined by channel edge/spoke portions of the placement member.

10. A method of conveying springs from a spring forming station, at which springs are formed from a length of wire, to a pocketing station, at which the springs are encased in pocketing material, in the manufacture of a pocketed spring unit, the method comprising temporarily retaining the springs in spring chambers on a placement member and causing the placement member to rotate so that the spring chambers each pass at least partly between moving conveyor belts causing the springs to be captured by the belts, wherein the springs are retained on a magnetic base beneath the placement member.

* * * * *